(12) United States Patent
Shintani et al.

(10) Patent No.: US 10,142,698 B2
(45) Date of Patent: Nov. 27, 2018

(54) METHOD AND SYSTEM FOR AUDIO DATA TRANSMISSION

(71) Applicant: SONY CORPORATION, Tokyo (JP)

(72) Inventors: Peter Shintani, San Diego, CA (US); Mahyar Nejat, San Diego, CA (US)

(73) Assignee: SONY CORPORATION, Tokyo (JP)

(*) Notice: Subject to any disclaimer, the term of this patent is extended or adjusted under 35 U.S.C. 154(b) by 355 days.

(21) Appl. No.: 14/571,607

(22) Filed: Dec. 16, 2014

(65) Prior Publication Data
US 2016/0173985 A1 Jun. 16, 2016

(51) Int. Cl.
| | |
|---|---|
| *H04N 5/445* | (2011.01) |
| *H04N 21/482* | (2011.01) |
| *H04N 21/488* | (2011.01) |
| *H04N 21/8547* | (2011.01) |

(52) U.S. Cl.
CPC ........... *H04N 21/482* (2013.01); *H04N 5/445* (2013.01); *H04N 21/4884* (2013.01); *H04N 21/8547* (2013.01)

(58) Field of Classification Search
CPC ............ H04N 21/482; H04N 21/4884; H04N 21/8547; H04R 3/12
USPC .......................... 348/515, 723, 725, 738, 729
See application file for complete search history.

(56) References Cited

U.S. PATENT DOCUMENTS

| | | | | |
|---|---|---|---|---|
| 8,401,580 B2* | 3/2013 | Anzures | ................ | G06Q 30/02 455/3.06 |
| 8,670,393 B2* | 3/2014 | Jain | ........................ | H04H 20/86 340/540 |
| 9,191,135 B2* | 11/2015 | Englert | ................... | H04H 60/37 |
| 2002/0183102 A1* | 12/2002 | Withers | ............. | G06Q 20/3274 455/575.1 |
| 2008/0172711 A1* | 7/2008 | Ishino | .................... | H04N 21/21 725/118 |
| 2013/0265500 A1* | 10/2013 | Kalbus | ................... | H04H 60/39 348/729 |

FOREIGN PATENT DOCUMENTS

CN 103596024 A 2/2014

OTHER PUBLICATIONS

Wikihow, "How to Hear TV Sound Without Blasting Everyone Else Out", Mar. 3, 2007, "http://www.wikihow.com/Hear-TV-Sound-Without-Blasting-Everyone-Else-Out".
Etymotic Research Inc., "How Can I Hear TV Comfortably Without Blasting My Family", Dec. 8, 2013, p. 3, "http://www.soundstrategy.com/content/hearing-faqs#41".

* cited by examiner

*Primary Examiner* — Trang U Tran
(74) *Attorney, Agent, or Firm* — Chip Law Group

(57) ABSTRACT

Various aspects of a method and system for audio data transmission are disclosed herein. The method includes selection of a frequency modulation (FM) band by a first electronic device. The FM band is selected to receive an audio portion of a multimedia content rendered at a display device. The method further includes receipt of a video description portion of the multimedia content, via the selected FM band.

20 Claims, 9 Drawing Sheets

METHOD AND SYSTEM FOR AUDIO DATA TRANSMISSION

FIELD

Various embodiments of the disclosure relate to audio data transmission. More specifically, various embodiments of the disclosure relate to audio data transmission via a frequency modulation (FM) band.

BACKGROUND

Advancements in the field of digital broadcasting have introduced various methods for audio data transmission of multimedia content. Currently, electronic devices use various wireless communication technologies, such as a wireless fidelity (Wi-Fi) network, a Bluetooth network, and/or a near field communication (NFC) network, for such audio data transmission.

In certain scenarios, an electronic device (such as a television (TV)) may transmit the audio data to one or more selected electronic devices (such as headsets) for playback. The audio data may be associated with multimedia content rendered at the TV. The audio data transmission may utilize one of the various wireless communication technologies, described above. However, in such scenarios, it may be desirable by the user to utilize one or more in-built features of a portable device (such as a smartphone) for reception, control and further transmission of such audio data received from the TV.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for audio data transmission is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
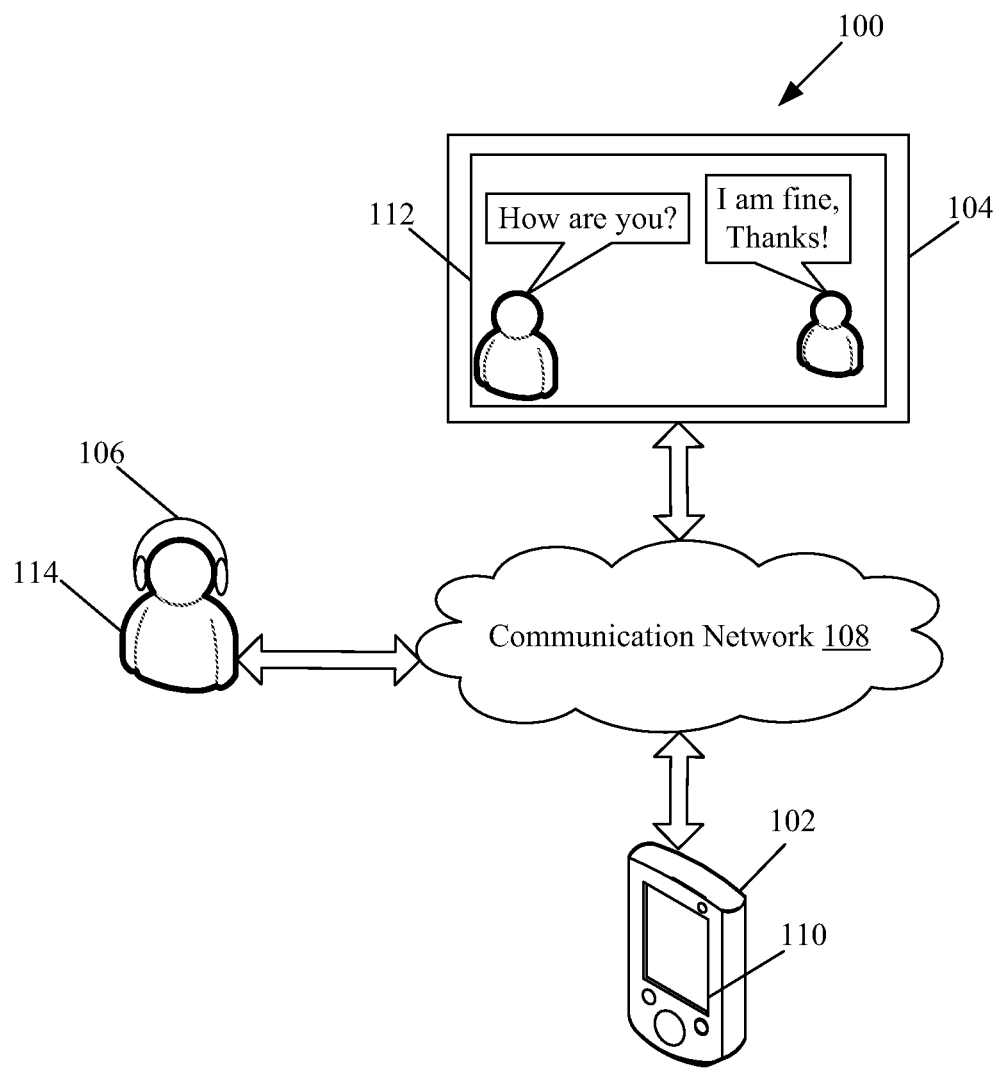
FIG. 1 is a block diagram that illustrates a network environment to implement the disclosed method and system for audio data transmission, in accordance with an embodiment of the disclosure.

Various implementations may be found in a method and/or system for audio data transmission. Exemplary aspects of the disclosure may comprise a method for audio data transmission implemented in a first electronic device. The method may comprise selection of a frequency modulation (FM) band to receive an audio portion of multimedia content rendered at a display device. Further, a video description portion of the multimedia content may be also received, via the selected FM band.

In accordance with an embodiment, the multimedia content may comprise the audio portion, a video portion, and/or the video description portion. The received audio portion may correspond to a primary audio associated with the multimedia content. The received video description portion may correspond to a secondary audio associated with the multimedia content. The received video description portion may comprise a first audio that may describe the video portion associated with the multimedia content and a second audio that may describe the additional information associated with the multimedia content. The additional information may comprise Electronic Program Guide (EPG) information, a trailer, a synopsis, a closed-caption, a sub-title, title, a rating, genre information, and/or metadata content associated with the multimedia content.

In accordance with an embodiment, the received audio portion may be associated with a first set of audio characteristics. The received video description portion may be associated with a second set of audio characteristics. The first set of audio characteristics and the second set of audio characteristics may comprise one or more of a pitch, a tone, intensity, and/or a harmonic content associated with the received audio portion and the received video description portion, respectively.

In accordance with an embodiment, the received audio portion and the received video description portion may be transmitted to second electronic device via a short-range communication network. The transmitted audio portion and the transmitted video description portion may be played back in synchronization with respect to each other at the second electronic device. The synchronization may comprise an adjustment of the first set of audio characteristics and the second set of audio characteristics with respect to each other. A notification may be transmitted to the display device when a power level associated with a battery of the first electronic device is less than a pre-defined threshold. In accordance with an embodiment, the selection of the FM band may be performed via a user interface (UI) rendered at the first electronic device.

Another exemplary aspect of the disclosure may comprise a method for audio data transmission implemented in the display device. The method may comprise transmission of an audio portion of multimedia content rendered at the display device, to the first electronic device. The transmission of the audio portion of the multimedia content may be performed via a selected FM band. Further, a video description portion of the multimedia content may be transmitted to the first electronic device, via the selected FM band. The transmission of the audio portion and the video description portion may be synchronized with respect to each other.

In accordance with an embodiment, the selected FM band may be assigned to the multimedia content, via a UI associated with the display device. In accordance with an embodiment, a language of the audio portion, and/or the video description portion may be selected based on a user preference and/or a geographical location of the display device and/or the first electronic device. The user preference may be received via the UI associated with the display device.

In accordance with an embodiment, one or more speakers associated with the display device may be disabled when the audio portion and/or the video description portion may be played back at the second electronic device. In accordance with an embodiment, another multimedia content may be simultaneously rendered at the display device. An audio portion of the other multimedia content may be transmitted via another selected FM band. In accordance with an embodiment, video description portion of the other multimedia content may be transmitted to the first electronic device, via the other selected FM band.

FIG. 1 is a block diagram that illustrates a network environment 100 for audio data transmission, in accordance with an embodiment of the disclosure. With reference to FIG. 1, there is shown a first electronic device 102, a display device 104, another electronic device, such as a second electronic device 106, and a communication network 108. The first electronic device 102 may include a first display screen 110. The display device 104 may include a second display screen 112. The first electronic device 102, the display device 104, and/or the second electronic device 106 may be associated with one or more users, such as a user 114. The first electronic device 102, the display device 104, and the second electronic device 106 may be communicatively coupled with each other, via the communication network 108. For simplicity, there is shown only one instance of the first electronic device 102 and the second electronic device 106. Notwithstanding, the disclosure may not be so limited, and the network environment 100 may comprise a plurality of instances of the first electronic device 102 and the second electronic device 106, without limiting the scope of the disclosure.

The first electronic device 102 may comprise suitable logic, circuitry, interfaces, and/or code that may be operable to receive one or more input actions from the user 114, via the first display screen 110. The first electronic device 102 may be operable to select an FM band to receive audio data associated with the multimedia content rendered on the display device 104. The first electronic device 102 may be further operable to transmit the received audio data to another electronic device, such as the second electronic device 106, via the communication network 108. Examples of the first electronic device 102 may include, but are not limited to, a laptop, a tablet computer, a smartphone, and/or a Personal Digital Assistant (PDA) device.

The display device 104 may comprise suitable logic, circuitry, interfaces, and/or code that may be operable to render the multimedia content. The display device 104 may be operable to receive one or more input actions from the user 114, via the first display screen 110 of the first electronic device 102. The display device 104 may be further operable to receive one or more input actions from the user 114, via the second display screen 112. Based on the received one or more input actions, the display device 104 may be further operable to assign a frequency modulation (FM) band to the multimedia content. The display device 104 may be further operable to transmit the audio data associated with the multimedia content, via the selected FM band, to another electronic device, such as the first electronic device 102. Examples of the display device 104 may include, but are not limited to, a television (TV), an Internet protocol television (IPTV), and/or a laptop.

The second electronic device 106 may comprise suitable logic, circuitry, interfaces, and/or code that may be operable to reproduce the audio data received from another electronic device, such as the first electronic device 102. The second electronic device 106 may be further operable to receive the audio data from the first electronic device 102, in a wired mode or a wireless mode. The second electronic device 106 may be operable to be worn by the user 114. Examples of the second electronic device 106 may include, but are not limited to, over-the-ear headphones, in-ear headphones, ear buds, noise cancelling headphones, wired headphones, and/or wireless headphones.

The communication network 108 may include a medium through which the first electronic device 102 may communicate with one or more electronic devices, such as the display device 104 and/or the second electronic device 106. Examples of the communication network 108 may include, but are not limited to, the Internet, a cloud network, a near field communication (NFC), a Wireless Fidelity (Wi-Fi) network, a Wireless Local Area Network (WLAN), a Local Area Network (LAN), a telephone line (POTS), and/or a Metropolitan Area Network (MAN). The communication network 108 may be operable to establish a communication channel for a frequency modulation (FM) band-based or other radio frequency (RF)-based communication. Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The first display screen 110 may comprise suitable logic, circuitry, interfaces, and/or code that may be operable to receive one or more preferences, and/or one or more input actions from the one or more users, such as the user 114. The first display screen 110 may be further operable to render the multimedia content received from the display device 104. The first display screen 110 may be operable to render one or more user selectable software buttons, such as control buttons, for the multimedia content rendered at the first electronic device 102, and/or the display device 104. The first display screen 110 may be realized through several known technologies that may include, but are not limited to, Liquid Crystal Display (LCD) display, Light Emitting Diode (LED) display, Organic LED (OLED) display technology.

The second display screen 112 may comprise suitable logic, circuitry, interfaces, and/or code that may be operable to render the multimedia content received from one or more content resources. The second display screen 112 may be operable to receive one or more preferences, and/or one or more input actions, from the one or more users, such as the user 114. Similar to the first display screen 110, the second display screen 112 may be realized through several known technologies that may include, but are not limited to, Liquid Crystal Display (LCD) display, Light Emitting Diode (LED) display, and/or Organic LED and/or (OLED) display technology.

In operation, the first electronic device 102 may be operable to render a first user interface (UI) at the first display screen 110. In accordance with an embodiment, the first UI rendered at the first display screen 110 may display one or more user selectable software buttons, such as the control buttons. The control buttons may include a button to start a playback of the multimedia content rendered at the display device 104. The control buttons may further include other navigational buttons to pause, fast forward, rewind, select, and/or stop the playback of the multimedia content.

In accordance with an embodiment, the display device 104 may be operable to render a second UI at the second display screen 112. The second UI rendered at the second display screen 112 may be operable to display the multimedia content. The multimedia content may correspond to audio-visual content received from one or more content resources. The multimedia content may be a live content received from an online content resource or a pre-recorded content received from a local storage or a remote storage.

The multimedia content may be associated with one or more multimedia components. The one or more multimedia components may include an audio portion, a video portion, and/or a video description portion associated with the multimedia content. The audio portion may correspond to a primary audio associated with the multimedia content, such as the sound component of the multimedia content. The video portion may be the visual component of the multimedia content. The video description portion may correspond to a secondary audio associated with the multimedia content. The video description portion may comprise a first audio that may describe the video portion associated with the multimedia content. The video description portion may further comprise a second audio that may describe additional information associated with the multimedia content. In other words, the video description portion may be the audio narrative of the video portion of the multimedia content and the additional information associated with the multimedia content. The additional information may be one or more of Electronic Program Guide (EPG) information, a trailer, a synopsis, a closed-caption, a sub-title, a title, a rating, genre information, and/or metadata content associated with the multimedia content. In accordance with an embodiment, the audio portion and the video description portion may be collectively referred to as audio data. The metadata content may correspond to available multimedia content, one or more multimedia components associated with the multimedia content, one or more unallocated FM bands, one or more FM bands assigned to one or more multimedia contents, and/or one or more languages that correspond to the multimedia content.

In accordance with an embodiment, the display device 104 may be operable to determine an authentication of the first electronic device 102, via a short-range communication network, such as an NFC network. In accordance with an embodiment, when the authentication is successful, a predetermined mode, such as a wireless headset mode, may be enabled in both the first electronic device 102 and the display device 104. In accordance with an embodiment, when the authentication is not successful, the display device 104 may be operable to provide an option to register the first electronic device 102, via the first UI and/or the second UI. The registration may be based on the one or more input actions performed by the user 114 on the first UI and/or the second UI.

In accordance with an embodiment, an external device, such as an FM transmitter dongle, may be inserted into an FM receptacle installed at the display device 104. Subsequently, one or more signals, such as handshake signals, may be transmitted back and forth between the FM transmitter dongle and the display device 104. Based on the handshake signals, a valid connection may be established between the FM transmitter dongle and the display device 104. Once the valid connection is established, a connection message may be displayed at the second UI rendered at the second display screen 112.

In accordance with an embodiment, the display device 104 may be operable to detect one or more unallocated FM bands with respect to a geographical location of the first electronic device 102 and/or the display device 104. The display device 104 may be operable to automatically assign an FM band from the detected one or more unallocated FM bands to a program channel of the desired multimedia content. Notwithstanding, the disclosure may not be so limited, and remaining unallocated FM bands may be assigned to other program channels associated with the remaining multimedia content, without limiting the scope of the disclosure.

In accordance with an embodiment, the display device 104 may be operable to display metadata content that may include the detected one or more unallocated FM bands at the second UI. The metadata content may further include the title of the multimedia content, the assigned FM bands, the time slots that may correspond to the multimedia content, and/or language of the multimedia content. The display device 104 may be operable to receive a preference from the user 114, via the metadata content displayed at the second UI. Based on the preference, one of the one or more unallocated FM bands may be assigned to the multimedia content.

In accordance with an embodiment, the display device 104 may be operable to transmit the metadata content to the first electronic device 102. In accordance with an embodiment, the first electronic device 102 may be operable to display the received metadata content at the first UI. In such a case, the first electronic device 102 may be operable to receive the preference from the user 114 to assign to the unallocated FM band to the multimedia content, via the control buttons displayed at the first UI. The first electronic device 102 may be further operable to communicate the received preference to the display device 104. Based on the preference provided by the user 114, an FM band may be assigned to the desired multimedia content.

In accordance with an embodiment, the first electronic device 102 may be manually connected to the second electronic device 106. In such a case, the user 114 may manually turn on the second electronic device 106 to receive the audio data transmitted by the first electronic device 102. In accordance with an embodiment, the first electronic device 102 may be automatically connected to the second electronic device 106, via the NFC network, based on a tapping operation. In such a case, the second electronic device 106 may be automatically turned on to receive the audio data transmitted by the first electronic device 102.

In accordance with an embodiment, the first electronic device 102 may be operable to receive the one or more multimedia components, via the selected FM band, only when the second electronic device 106 is connected to the first electronic device 102. In accordance with an embodiment, the first electronic device 102 may not be operable to receive the one or more multimedia components when the second electronic device 106 is not connected to the first electronic device 102. In such a case, the audio data from the one or more multimedia components may be played back for the user 114, via one or more speakers associated with the first electronic device 102.

In accordance with an embodiment, the user 114 may select the FM band and the multimedia content, via the metadata content displayed at the first UI or the second UI, for play back. The display device 104 may be operable to transmit the one or more multimedia components to the first electronic device 102, via the selected FM band. The display device 104 may be further operable to transmit a first set of characteristics associated with the audio portion and/or a second set of characteristics associated with the video description portion of the multimedia content. The display device 104 may be operable to transmit the first set of characteristics and/or the second set of characteristics to the first electronic device 102, via the selected FM band. The first set of characteristics and the second set of characteristics may include, but are not limited to, a pitch, a tone, intensity, and/or a harmonic content, associated with the audio portion and the video description portion, respectively. In accordance with an embodiment, the display device 104 may be operable to synchronize the audio portion with respect to the video description portion. In such a case, the display device 104 may be operable to transmit the synchronized audio portion and the video description portion to the first electronic device 102, via the selected FM band.

In accordance with an embodiment, the first electronic device 102 may be operable to synchronize the received audio portion with respect to the received video description portion. In such a case, the first electronic device 102 may be operable to determine the first set of characteristics and/or the second set of characteristics associated with the received audio portion with respect to the received video description portion, respectively. The received audio portion and the video description portion may be synchronized with respect to each other such that the audio portion and the video description portion are differentiable for the user 114 when played back. Such synchronization may be based on adjustment of the received first set of characteristics associated with the audio portion and/or the second set of characteristics associated with video description portion. The first electronic device 102 may be operable to transmit the received one or more multimedia components, such as the audio portion and/or the video description portion, to the second electronic device 106 for reproduction. In accordance with an embodiment, the display device 104 may be operable to automatically disable the associated one or more speakers, when the reproduction of the multimedia content begins at the second electronic device 106.

In accordance with an embodiment, the first electronic device 102 may be operable to transmit battery information to the display device 104. The first electronic device 102 may be operable to transmit a notification to the display device 104, when the power level associated with the battery of the first electronic device 102 becomes less than a pre-defined threshold. In accordance with an embodiment, the display device 104 may be operable to display the notification at the second UI. In accordance with an embodiment, the pre-defined threshold may be configured based on one of the one or more preferences provided by the user 114, and/or a default system configuration stored at the display device 104.

In accordance with an embodiment, the display device 104 may be operable to simultaneously receive multimedia content from more than one content resource. In such a case, the received multimedia content may be rendered at one or more pre-defined regions of the second display screen 112. In accordance with an embodiment, the user 114 may provide a preference to select an FM band for the desired multimedia content from a plurality of multimedia content rendered at the second UI. The user 114 may provide the preference via the metadata content displayed at the first UI or the second UI. In accordance with an embodiment, the display device 104 may be operable to transmit one or more components of the desired multimedia content to the first electronic device 102, via the selected FM band. The display device 104 may further disable the multimedia components of multimedia content other than the selected multimedia content. One of the one or more multimedia components, such as the video portion, may be rendered at the first UI of the first electronic device 102. Others of the one or more multimedia components, such as the audio data, may be transmitted to the second electronic device 106, via the communication network 108.

Figure 2A:
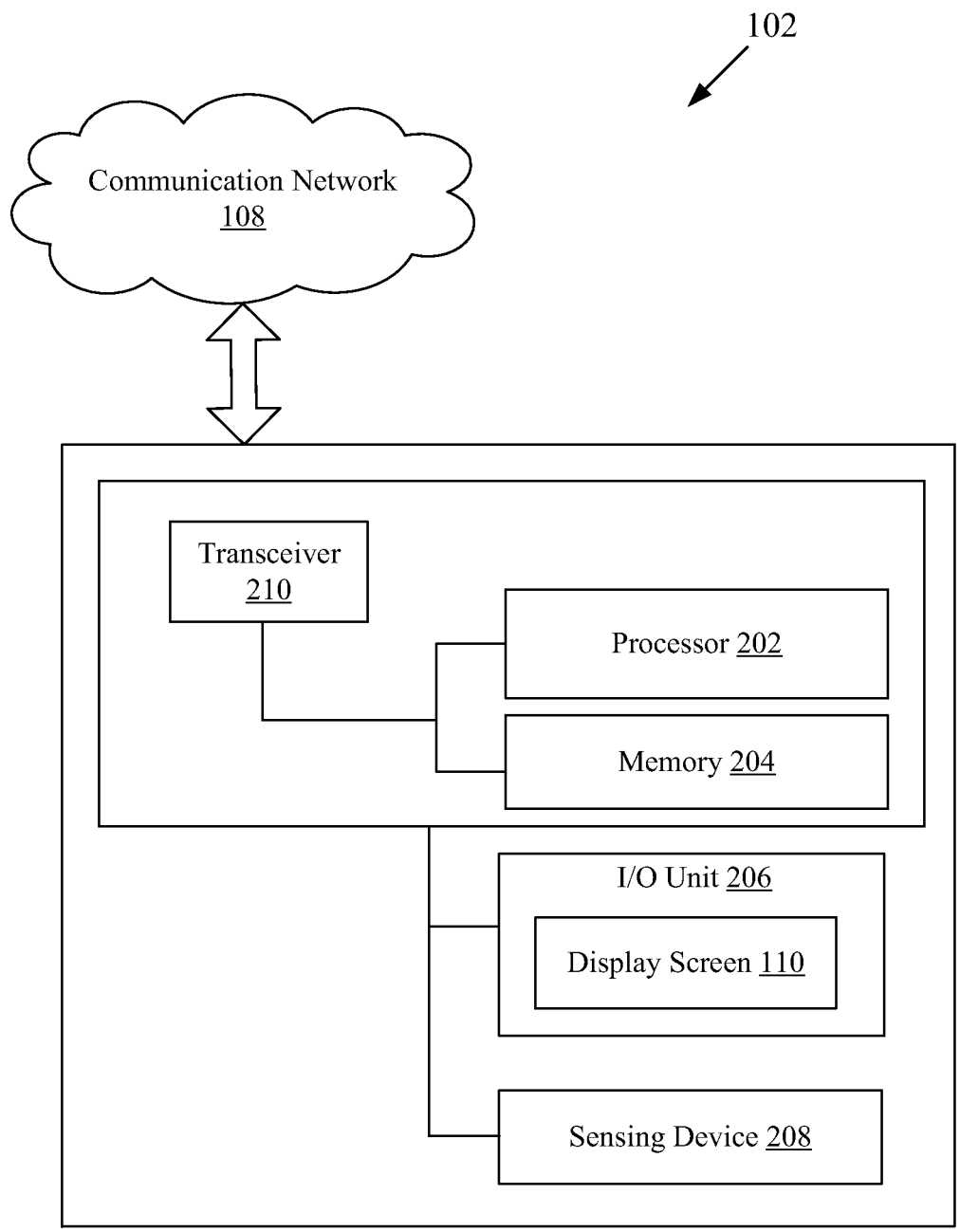
FIGS. 2A and 2B are block diagrams that illustrate an exemplary first electronic device and an exemplary display device, respectively, in accordance with an embodiment of the disclosure.

FIG. 2A is a block diagram that illustrates an exemplary first electronic device 102, in accordance with an embodiment of the disclosure. FIG. 2A is explained in conjunction with elements from FIG. 1. With reference to FIG. 2A, there is shown the first electronic device 102. The first electronic device 102 may comprise one or more processors, such as a processor 202. The first electronic device 102 may further comprise a memory 204, and one or more input/output (I/O) devices, such as an I/O unit 206. The I/O unit 206 may comprise the first display screen 110. The first electronic device 102 may further comprise one or more sensing units, such as the sensing device 208, and a transceiver 210. The processor 202 may be communicatively coupled to the memory 204, the I/O unit 206, the sensing device 208, and the transceiver 210.

The processor 202 may comprise suitable logic, circuitry, interfaces, and/or code that may be operable to execute a set of instructions stored in the memory 204. The processor 202 may be operable to receive the one or more multimedia components, such as the audio portion and/or the audio description (hereinafter, collectively referred to as "audio data") associated with the multimedia content, transmitted by the display device 104. The processor 202 may be further operable to transmit the received audio data to the second electronic device 106. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the processor 202. The memory 204 may further be operable to store unique identification parameters that correspond to the first electronic device 102. Examples of implementation of the memory 204 may include, but are not limited to, Random Access Memory (RAM), Read Only Memory (ROM), Hard Disk Drive (HDD), and/or a Secure Digital (SD) card.

The I/O unit 206 may comprise suitable logic, circuitry, interfaces, and/or code that may be operable to receive an input from the user 114, or provide an output to the user 114. The I/O unit 206 may comprise various input and output devices that may be operable to communicate with the processor 202. Examples of the input devices may include, but are not limited to, a keyboard, a touch screen, a microphone, a camera, a motion sensor, a light sensor, and/or a docking station. Examples of the output devices may include, but are not limited to, the first display screen 110, and/or a speaker. The first display screen 110 may be operable to receive one or more input actions from the one or more users, via a touch-sensitive screen. Such one or more input actions may be received from the one or more users by means of a virtual keypad, a stylus, touch-based input actions, and/or a gesture. The first display screen 110 may be realized through several known technologies such as, but not limited to, Liquid Crystal Display (LCD) display, Light Emitting Diode (LED) display, and/or Organic LED (OLED) display technology.

The sensing device 208 may comprise suitable logic, circuitry, and/or interfaces that may be operable to store a machine code and/or a computer program having at least one code section executable by the processor 202. The sensing device 208 may comprise one or more sensors to confirm recognition, identification and/or verification of the user 114. The one or more sensors may comprise a camera to detect at least one of a fingerprint, palm geometry, a two-dimensional (2D) or three-dimensional (3D) facial profile, characteristic features of the iris, and/or a retinal scan of the user 114. The one or more sensors may further include a microphone to detect a voice pattern of the user 114. The one or more sensors may comprise capacitive-touch sensors to detect one or more touch-based input actions received from the user 114, via the first display screen 110. The one or more sensors may comprise proximity sensors to detect the display device 104 within a pre-determined proximity. The sensing device 208 may implement various known algorithms for user recognition, user identification and/or user verification. Examples of such algorithms include, but are not limited to, algorithms for face recognition, voice recognition, iris recognition, password matching, proximity detection based on a global positioning system (GPS) enabled electronic device associated with the user 114, and/or fingerprint matching.

The transceiver 210 may comprise suitable logic, circuitry, interfaces, and/or code that may be operable to communicate with the display device 104, via the FM bands from the communication network 108. The transceiver 210 may be further operable to communicate with the second electronic device 106, via the communication network 108. The transceiver 210 may implement known technologies to support wired or wireless communication of the first electronic device 102 with the communication network 108. The transceiver 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e. 120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be detected by the display device 104 when the processor 202 is within a pre-determined proximity of the display device 104. In accordance with an embodiment, the processor 202 may be operable to establish a communicative coupling with the display device 104, via a short-range communication network, such as an NFC network. In accordance with an embodiment, the transceiver 210 may be operable to receive an authentication request from the display device 104. The processor 202 may be operable to respond to the authentication request transmitted by the display device 104. In response to the authentication request, the processor 202 may be operable to retrieve one or more unique identification parameters, such as a device identifier, that may correspond to the first electronic device 102, from the memory 204. In accordance with an embodiment, the processor 202 may be operable to communicate the retrieved one or more unique identification parameters to the display device 104. Based on the one or more unique identification parameters, the first electronic device 102 may be identified as a registered device by the display device 104.

In accordance with an embodiment, the processor 202 may be operable to receive a registration request, in case the first electronic device 102 is not identified as a registered device by the display device 104. The processor 202 may be operable to respond to the registration request from the display device 104, by displaying a prompt on the first UI rendered at the first display screen 110. In response to the displayed prompt, the I/O unit 206 may be operable to receive user input provided by the user 114. The user input may include, but is not limited to, a gesture or a speech input related to the one or more unique identification parameters associated with the first electronic device 102. In accordance with an embodiment, the I/O unit 206 may be operable to communicate the received user input to the processor 202. In accordance with an embodiment, the processor 202 may be operable to communicate one or more unique identification parameters to the display device 104, to complete the registration of the first electronic device 102.

In accordance with an embodiment, the processor 202 may be operable to enable a pre-determined mode, such as a wireless headphone mode, when a pre-determined operation is performed between the authenticated first electronic device 102 and the display device 104. The pre-determined operation may be a tapping operation, for example, between the authenticated first electronic device 102 and the display device 104. In such a case, the pre-determined mode, such as the wireless headphone mode, may be enabled in the display device 104. In such a pre-determined mode, the display device 104 may be operable to switch to an FM-transmission mode and the transceiver 210 may be operable to switch to an FM-reception mode. The processor 202 may be further operable to detect the second electronic device 106 when within the pre-determined proximity, via a short-range communication network, such as the NFC network. Further, one or more speakers may be disabled in the display device 104 when the pre-determined mode is the wireless headphone mode.

In accordance with an embodiment, the processor 202 may be operable to receive one or more multimedia components from the display device 104, via an FM band, only when the second electronic device 106 is communicatively coupled to the first electronic device 102. The processor 202 may be further operable to transmit audio data from the received one or more multimedia components to the second electronic device 106. In such a case, the second electronic device 106 may be operable to play back the audio data received from the processor 202. In accordance with an embodiment, the processor 202 may be operable to receive the one or more multimedia components, via the FM band, when the second electronic device 106 is not communicatively coupled to the first electronic device 102. In such a case, the I/O unit 206 may be operable to play back the audio data from the received one or more multimedia components, via one or more speakers associated with the first electronic device 102.

In accordance with an embodiment, the I/O unit 206 may be operable to display a first UI at the first display screen 110. The I/O unit 206 may be operable to receive a user input to start the playback of one or more multimedia components associated with the multimedia content rendered at the display device 104. In accordance with an embodiment, the processor 202 may be operable to receive a preference, via metadata content displayed at the first UI.

In accordance with an embodiment, the processor 202 may communicate the preference to the display device 104, via the transceiver 210. The processor 202 may be further operable to tune the transceiver 210 to a frequency associated with the FM band based on the selected metadata content. Based on the selection, the processor 202 may be operable to receive one or more multimedia components, via the selected FM band. The received one or more multimedia components may correspond to the selected multimedia content rendered at the second display screen 112.

In accordance with an embodiment, the processor 202 may be operable to synchronize the audio data from the received one or more multimedia components. The transceiver 210 may be operable to transmit the synchronized audio data to the second electronic device 106, via the communication network 108. In accordance with an embodiment, the processor 202 may be further operable to transmit a message to the display device 104 when the audio data is reproduced and played back at the second electronic device 106.

In accordance with an embodiment, the processor 202 may be operable to monitor a power level of the battery associated with the first electronic device 102. The processor 202 may be further operable to transmit battery information to the display device 104, when the power level of the battery associated with the first electronic device 102 becomes less than a pre-defined threshold. In such a case, the processor 202 may be operable to turn off the pre-determined mode, such as the wireless headphone mode. Consequently, the processor 202 may not be operable to transmit the audio data to the second electronic device 106. In accordance with an embodiment, the pre-defined threshold may be configured based on the preference of the user 114 and/or a default system configuration of the first electronic device 102.

Figure 2B:
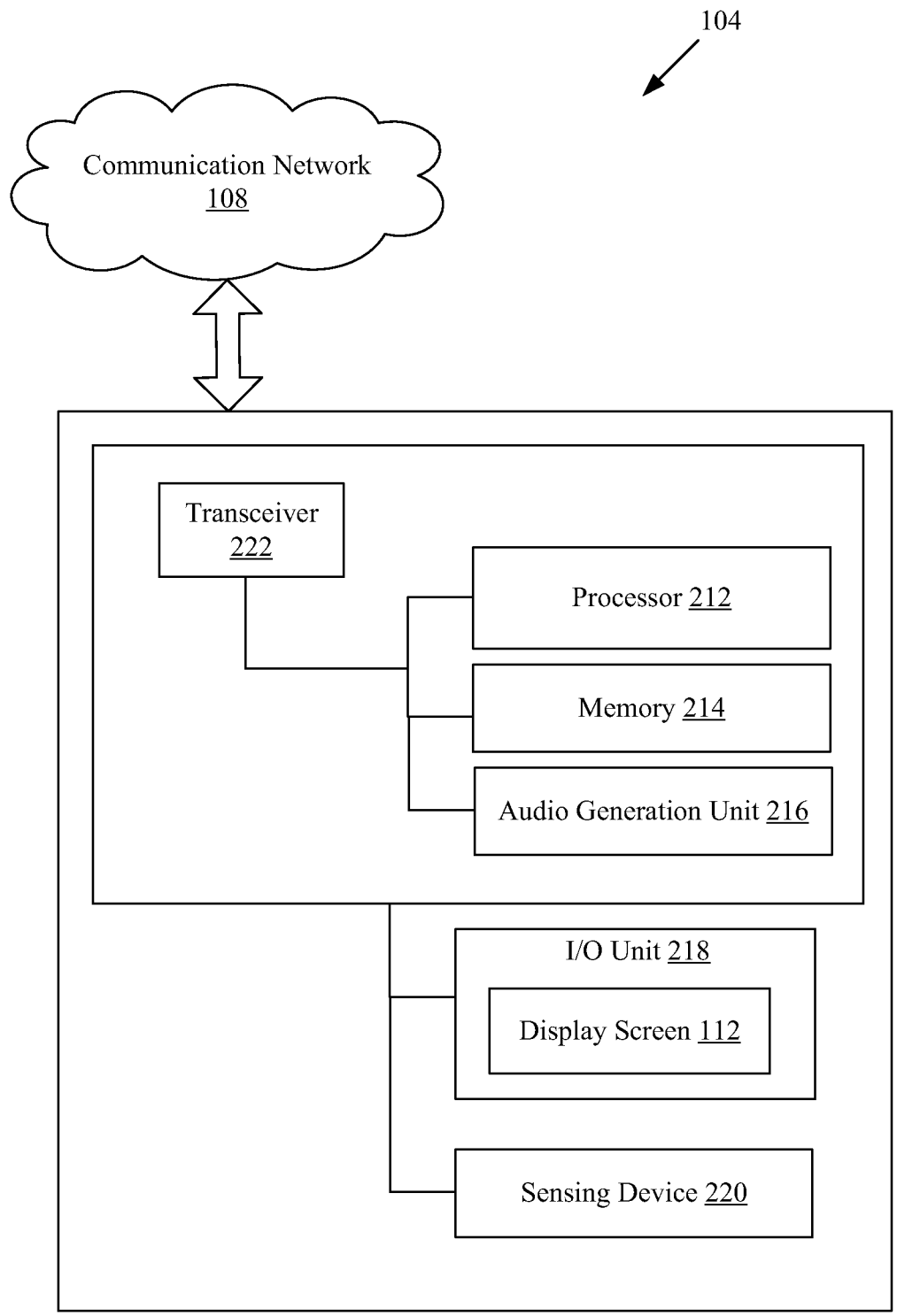

FIG. 2B is a block diagram that illustrates an exemplary display device 104, in accordance with an embodiment of the disclosure. FIG. 2B is explained in conjunction with elements from FIG. 1 and FIG. 2A. With reference to FIG. 2B, there is shown the display device 104. The display device 104 may comprise one or more processors, such as a processor 212. The display device 104 may further comprise a memory 214, an audio generation unit 216, and one or more input/output (I/O) devices, such as an I/O unit 218. The I/O unit 218 may comprise the second display screen 112. The display device 104 may further comprise one or more sensing units, such as the sensing device 220, a transceiver 222, and a decoder 224. The processor 212 may be communicatively coupled to the memory 214, the audio generation unit 216, the I/O unit 218, the sensing device 220, and the transceiver 222.

The processor 212 may comprise suitable logic, circuitry, interfaces, and/or code that may be operable to execute a set of instructions stored in the memory 214. The processor 212 may be operable to assign the unallocated frequency modulation (FM) bands to the desired multimedia content. The processor 212 may be operable to transmit the one or more multimedia components to the first electronic device 102. The implementation of the processor 212 may be similar to the processor 202.

The memory 214 may comprise suitable logic, circuitry, and/or interfaces that may be operable to store a machine code and/or a computer program with at least one code section executable by the processor 212. The memory 214 may be further operable to store one or more text-to-speech conversion algorithms, one or more speech-generation algorithms, and/or other such algorithms. The implementation of the memory 214 may be similar to the memory 204.

The audio generation unit 216 may comprise suitable logic, circuitry, interfaces, and/or code that may be operable to dynamically perform text-to-speech conversion of the additional information in a desired language, based on the preference provided by the user 114. The audio generation unit 216 may be operable to retrieve one or more text-to-speech conversion algorithms and one or more speech generation algorithms from the memory 214, to generate an audio output. The generated audio output may be played by an output device, such as a speaker associated with the I/O unit 218. Notwithstanding, the disclosure may not be so limited, the one or more text-to-speech conversion algorithms and speech generation algorithms may be known in the art, and may be utilized to generate the audio output without limiting the scope of the disclosure.

The I/O unit 218 may comprise suitable logic, circuitry, interfaces, and/or code that may be operable to receive an input from the user 114, or provide an output to the user 114. The I/O unit 218 may comprise various input and output devices that may be operable to communicate with the processor 212. Examples of the input devices may include, but are not limited to, a keyboard, a touch screen, a microphone, a camera, a motion sensor, a light sensor, and/or a docking station. Examples of the output devices may include, but are not limited to, the second display screen 112, and/or a speaker. The second display screen 112 may be operable to receive one or more input actions from the one or more users, via a touch-sensitive screen. Such one or more input actions may be received from the one or more users by means of a virtual keypad, a stylus, a touch-based input action, and/or a gesture. The second display screen 112 may be realized through several known technologies such as, but not limited to, Liquid Crystal Display (LCD) display, Light Emitting Diode (LED) display, and/or Organic LED (OLED) display technology.

The sensing device 220 may comprise suitable logic, circuitry, and/or interfaces that may be operable to store a machine code and/or a computer program with at least one code section executable by the processor 212. The sensing device 220 may comprise one or more sensors to confirm recognition, identification and/or verification of the user 114. The one or more sensors may comprise a camera to detect at least one of a fingerprint, palm geometry, a 2D or 3D facial profile, characteristic features of the iris, and/or a retinal scan of the user 114. The one or more sensors may further include a microphone to detect a voice pattern of the user 114. The one or more sensors may comprise capacitive-touch sensors to detect one or more touch-based input actions received from the user 114, via the second display screen 112. The one or more sensors may comprise one or more proximity sensors to detect the first electronic device 102, when within the pre-determined proximity. The sensing device 220 may implement various known algorithms for user recognition, user identification and/or user verification. Examples of such algorithms include, but are not limited to, algorithms for face recognition, voice recognition, iris recognition, password matching, proximity detection based on a GPS enabled another electronic device associated with the user 114, and/or fingerprint matching.

The transceiver 222 may comprise suitable logic, circuitry, interfaces, and/or code that may be operable to communicate with the first electronic device 102, via the communication network 108. The transceiver 222 may implement known technologies to support wired or wireless communication of the display device 104 with the communication network 108. The transceiver 222 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 222 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e. 120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 212 may be operable to detect the first electronic device 102, via a short-range communication network, such as an NFC network, when within the pre-determined proximity. In such a case, the processor 212 may authenticate the first electronic device 102 based on one or more unique identification parameters received from the processor 202. The processor 212 may be operable to identify the first electronic device 102 as a registered device based on a successful authentication. In accordance with an embodiment, a pre-determined mode, such as a wireless headset mode, may be enabled in both the authenticated first electronic device 102 and the display device 104. In accordance with an embodiment, when the authentication is not successful, the I/O unit 218 may be operable to provide an option on the second UI to register the first electronic device 102. In accordance with an embodiment, the registration may be based on one or more input actions performed by the user 114, on the first UI. In accordance with an embodiment, the sensing device 220 may be operable to receive the one or more input actions on the second UI. Notwithstanding, the disclosure may not be so limited, and the processor 212 may be operable to detect and/or authenticate more than one instance of the first electronic device 102, without limiting the scope of the disclosure.

In accordance with an embodiment, the processor 212 may be operable to receive the multimedia content from a content resource, via the transceiver 222. Examples of the content resource may include a content server, a digital broadcast station, a Digital video Disc (DVD), a Compact Disc (CD), a flash drive, and/or the like. In accordance with an embodiment, the processor 212 may be operable to simultaneously receive a plurality of multimedia contents from a plurality of content resources, via the transceiver 222. In such a case, the plurality of multimedia contents may be rendered at one or more portions of the second display screen 112, in one or more formats. Examples of the one or more formats may include a picture-in-picture (PiP) view, a tile view, a grid view, a matrix view, and/or the like.

In accordance with an embodiment, the multimedia content may correspond to audio visual content rendered at the second UI. The multimedia content may be a live content or a pre-recorded content received from one or more content resources. The multimedia content may be associated with one or more multimedia components. The one or more multimedia components may comprise an audio portion, a video portion, and a video description portion associated with the multimedia content. The video description portion may further comprise a first audio that describes the video portion associated with the multimedia content. The video description portion may further comprise a second audio that describes the additional information associated with the multimedia content.

In accordance with an embodiment, the audio portion may correspond to a primary audio associated with the multimedia content. The audio portion may be associated with a first set of audio characteristics. The video description portion may correspond to a secondary audio associated with the multimedia content. The video description portion may be associated with a second set of audio characteristics. The first set of characteristics and the second set of characteristics may include, but are not limited to, a pitch, a tone, intensity, and/or a harmonic content associated with the audio portion and the video description portion, respectively. Based on the first set of characteristics and the second set of characteristics, the processor 212 may be operable to synchronize the audio portion with the video description portion with respect to each other.

In accordance with an embodiment, the processor 212 may be operable to detect one or more unallocated FM bands with respect to a geographical location of display device 104. In accordance with an embodiment, the processor 212 may be operable to receive the geographical location from the first electronic device 102, via the transceiver 222. In such a case, the processor 212 may be operable to detect one or more unallocated FM bands with respect to the geographical location of the first electronic device 102.

The display device 104 may be operable to render the second UI at the second display screen 112. The processor 212 may be operable to display the detected unallocated FM bands at the second UI. The processor 212 may issue a command for the I/O unit 218 to display the metadata content that presents user selectable options at the second UI. In accordance with an embodiment, the user selectable options may comprise an option to assign an FM band to the multimedia content, an option to change an FM band assigned to the multimedia content, and/or an option to cancel the assignment of an FM band to the multimedia content. The user selectable options may further comprise an option to choose one or more languages in which one or more multimedia components are to be transmitted to the first electronic device 102, via the assigned FM band.

In accordance with an embodiment, the I/O unit 218 may be operable to receive a user selection that corresponds to the displayed selectable options, via one of the second display screen 112 and/or a remote device associated with the display device 104 (not shown). The I/O unit 218 may be operable to receive a user selection that corresponds to the displayed selectable options from the first electronic device 102, via the transceiver 222. The I/O unit 218 may be operable to communicate the user selection to the processor 212. The I/O unit 218 may be operable to store the received user selection in the memory 214. In accordance with an embodiment, the processor 212 may be operable to automatically assign each of the detected unallocated FM bands to each of the plurality of multimedia contents, based on the received user selection.

In accordance with an embodiment, the processor 212 may issue a command for the I/O unit 218 to display metadata content that may correspond to the multimedia content, on the second UI. The processor 212 may be operable to transmit the metadata content to the first electronic device 102, via the transceiver 222. The processor 212 may be operable to receive a preference from the first electronic device 102, via the first UI. The processor 212 may be operable to receive a preference from the first electronic device 102, via the second UI. In accordance with an embodiment, the processor 212 may receive a manual selection of desired FM band and the associated multimedia content provided by the user 114, via the first UI or the second UI.

In accordance with an embodiment, based on the preference, the processor 212 may be operable to transmit the one or more multimedia components to the first electronic device 102, via the selected FM band. Based on received preference, the processor 212 may be further operable to select a desired language of the one or more multimedia components prior to the transmission. In accordance with an embodiment, the processor 212 may be operable to select a language preference based on the geographical location of the display device 104 and/or the first electronic device 102. The processor 212 may be operable to translate the multimedia content to the desired language that corresponds to the received preference. The audio generation unit 216 may be operable to generate an audio that corresponds to the additional information associated with the multimedia content. In such a case, the generated audio may be translated to the desired language that corresponds to the received preference.

In accordance with an embodiment, the processor 212 may be operable to enable a pre-determined mode, such as a wireless headphone mode, when a pre-determined operation is performed between the authenticated first electronic device 102 and the display device 104. In such a case, the processor 202 may be operable to enable the pre-determined mode, such as the wireless headphone mode. In such a pre-determined mode, the transceiver 222 may be operable to switch to an FM-transmission mode, and the transceiver 210 may be operable to switch to an FM-reception mode. Further, the processor 212 may be operable to disable one or more speakers in the I/O unit 218.

In accordance with an embodiment, the processor 212 may be operable to receive a notification from the first electronic device 102, when reproduction and playback of the audio data begins at the second electronic device 106. In accordance with an embodiment, based on the received notification, the processor 212 may be operable to disable one or more speakers associated with the display device 104. The processor 212 may be operable to issue a command for the I/O unit 218 to display a message on the second UI that one or more speakers are disabled.

In accordance with an embodiment, the processor 212 may be operable to receive another notification with respect to battery information associated with the first electronic device 102, via the transceiver 222. The notification may correspond to a power level associated with the battery of the first electronic device 102. The processor 212 may be operable to instruct the I/O unit 218 to display the received notification on the second UI. The I/O unit 218 may be operable to notify the user 114 based on the notification displayed at the second UI. The I/O unit 218 may be operable to notify the user 114 based on output of an audible signal from the one or more speakers associated with the display device 104.

Figure 3A:
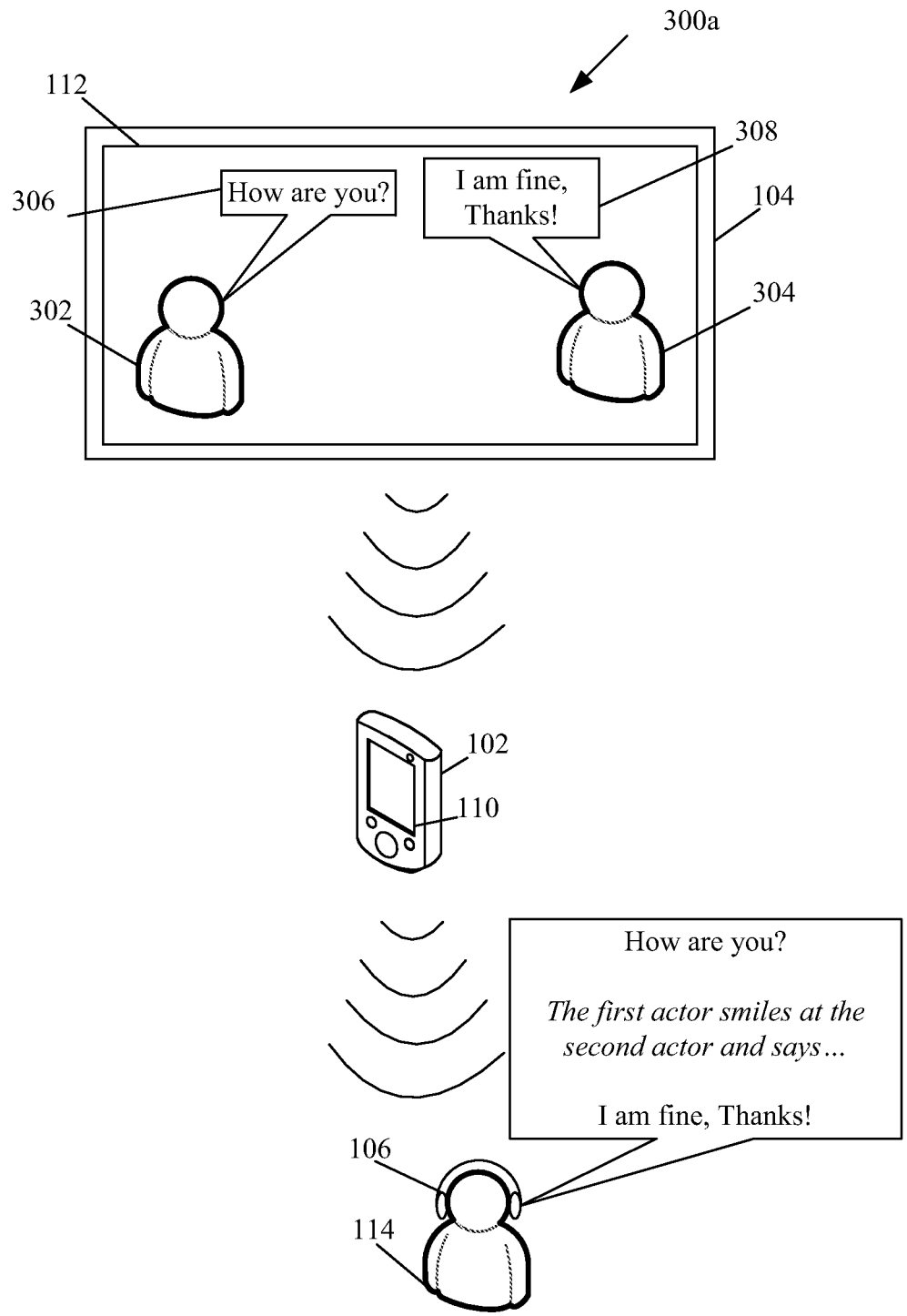
FIGS. 3A and 3B illustrate an exemplary scenario to implement the disclosed method and system for audio data transmission, in accordance with an embodiment of the disclosure.
Figure 3B:
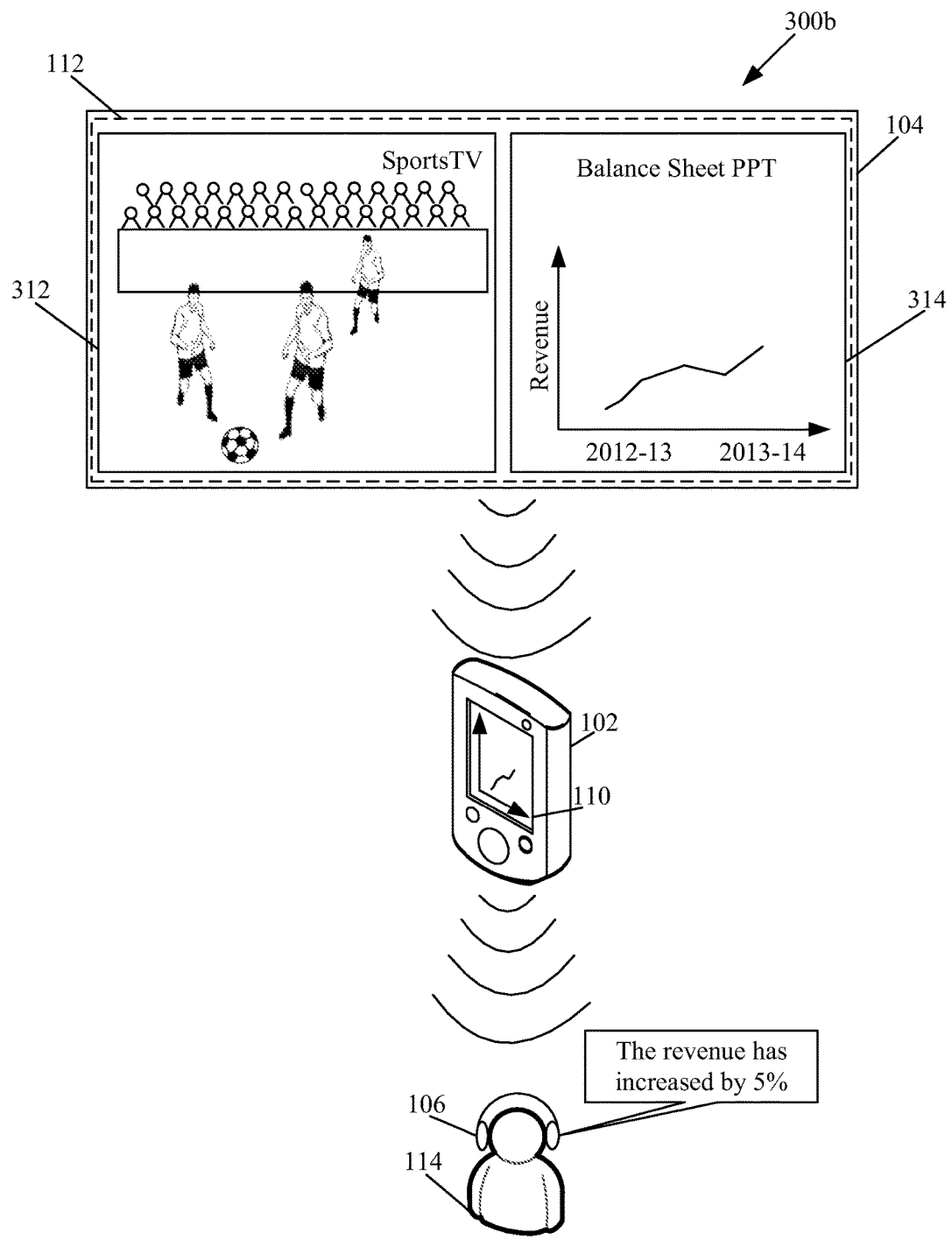

FIGS. 3A and 3B illustrate exemplary scenarios to implement the disclosed method and system for audio data transmission, in accordance with an embodiment of the disclosure. FIGS. 3A and 3B are explained in conjunction with elements from FIG. 1 and FIGS. 2A and 2B.

With reference to FIG. 3A, an exemplary scenario 300a is illustrated. There is shown the first electronic device 102, such as a smartphone, the display device 104, such as a television (TV), and the second electronic device 106, such as headsets. There is further shown multimedia content rendered on the display device 104. The multimedia content may be associated with one or more multimedia components, such as a video portion, and audio portion and/or a video description portion. The video portion of the multimedia content may correspond to a first screen object 302 and a second screen object 304 displayed at the second display screen 112. The audio portion of the multimedia content may correspond to a first dialogue 306 (spoken by the first screen object 302) and a second dialogue 308 (spoken by the second screen object 304). The video description portion of the multimedia content may correspond to an audio content, such as, "The first actor smiles at the second actor and says . . . " associated with the video portion. The audio content, such as, "The first actor smiles at the second actor and says . . . " associated with the video portion may correspond to the first audio, as described in FIG. 1. The video description portion may correspond to the timestamps between the first dialogue 306 and a second dialogue 308 when the first screen object 302 smiles at the second screen object 304.

With reference to FIG. 3A, the video portion may comprise the first screen object 302, and the second screen object 304, which may be actors in a conversation with each other. The medium of conversation may be English. The conversation may include two dialogues spoken by the actors. The first dialogue 306, such as, "How are you?" may be spoken by the first actor. The second dialogue 308, such as, "I am fine, Thanks", may be spoken by the second actor. The conversation between the two actors may correspond to the audio portion of the multimedia content. In between the conversations, the first screen object 302 may smile at the second screen object 304. The video description portion may be the audio content, such as, "The first actor smiles at the second actor and says . . . " associated with the video portion.

In accordance with an embodiment, the processor 212 may be operable to synchronize the video description portion associated with the audio portion of the multimedia content. The processor 212 may determine the audio sequence as: the first dialogue 306, such as, "How are you?", the video description portion, such as, "The first actor smiles at the second actor and says . . . ", and the second dialogue 308, such as "I am fine, Thanks". In such a case, the first dialogue 306, the second dialogue 308, and the video description portion may be associated with corresponding timestamps and time durations. The first dialogue 306, the second dialogue 308, and the video description portion may be synchronized in such a way that the corresponding timestamps and time durations do not overlap.

In accordance with an embodiment, the display device 104 may be operable to transmit the audio sequence to the first electronic device 102, via the selected FM band. The first electronic device 102 may further transmit the audio sequence to the second electronic device 106, via the communication network 108, such as a Bluetooth network. The second electronic device 106 may reproduce the audio sequence for the user 114. In accordance with an embodiment, the user 114 may be visually impaired. Once the reproduction of the audio sequence at the second electronic device 106 begins, the display device 104 may disable the associated one or more speakers.

With reference to FIG. 3B, an exemplary scenario 300b is illustrated. There is shown the exemplary display device 104, operable to render a first multimedia content in a first region 312, and a second multimedia content in a second region 314 of the second display screen 112. The first multimedia content rendered in the first region 312, may correspond to a soccer match broadcast on a sports channel, such as, "SportsTV". The second multimedia content rendered in the second region 314, may correspond to a power point presentation, such as, "Balance Sheet PPT". The first multimedia content may be received from a digital broadcast server (not shown), and the second multimedia content may be received from a DVD player (not shown).

The processor 212 may assign a first FM band, such as "FM1", to the first multimedia content and a second FM band, such as "FM2", to the second multimedia content. A first audio portion associated with the first multimedia content may be a first dialogue, such as "What a Goal!". A second audio portion associated with the second multimedia content may be a second dialogue, such as, "The revenue has increased by 5%".

With reference to FIG. 3B, the user 114 may select the second FM band, such as "FM2", via the second UI. In accordance with an embodiment, the user 114 may be visually impaired. Based on the selection, the processor 212 may transmit one or more multimedia components of the second multimedia content to the first electronic device 102. The video portion of the second multimedia content may be rendered at the first UI of the first electronic device 102. The second dialogue, such as, "The revenue has increased by 5%", of the second multimedia content may be transmitted to the first electronic device 102, via the second FM band, such as "FM2". The first electronic device 102 may be further operable to transmit the second dialogue to the first electronic device 102, via the communication network 108.

Figure 4A:
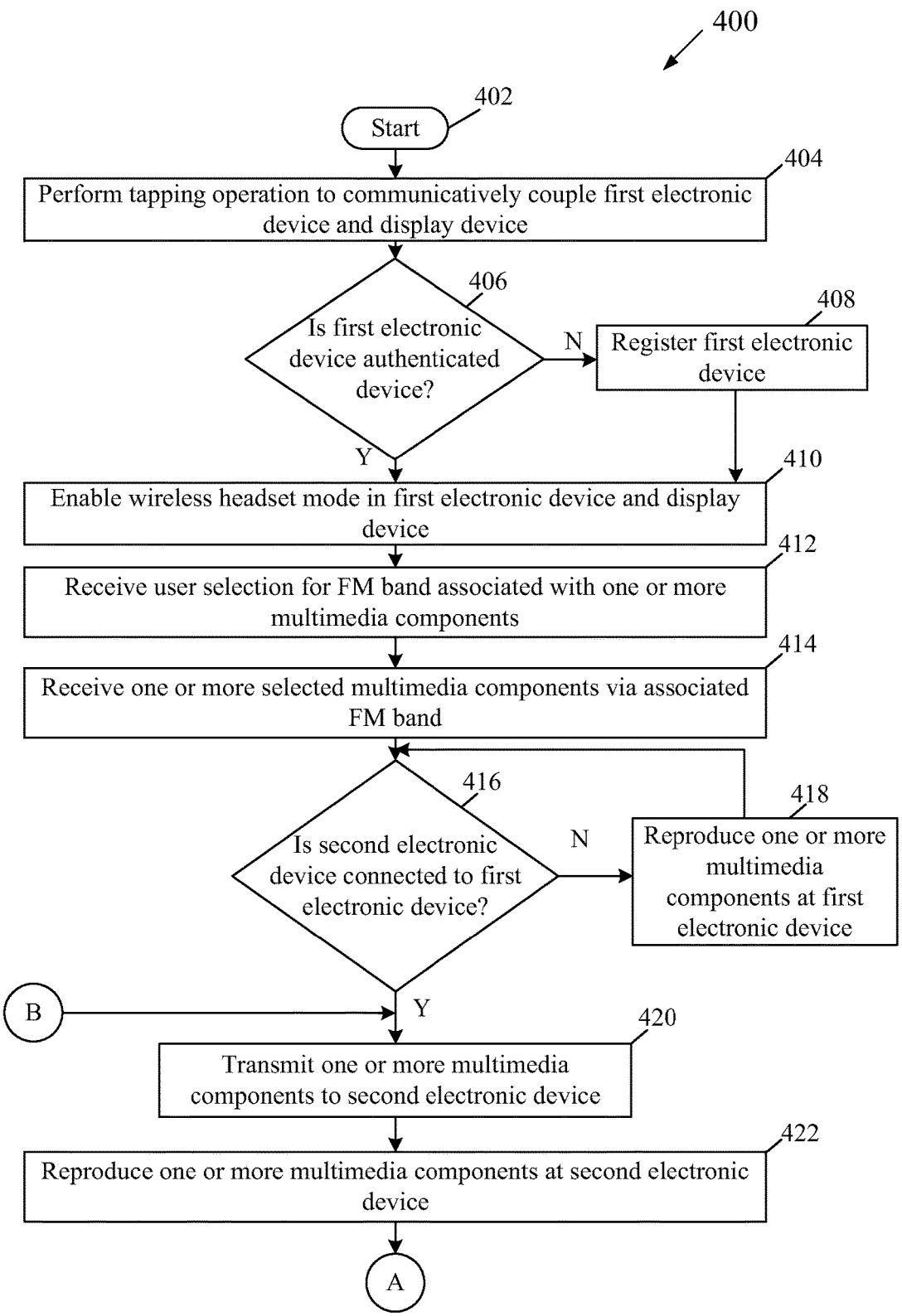
FIGS. 4A and 4B are flowcharts that illustrate a method for audio data transmission, in accordance with an embodiment of the disclosure.
Figure 4B:
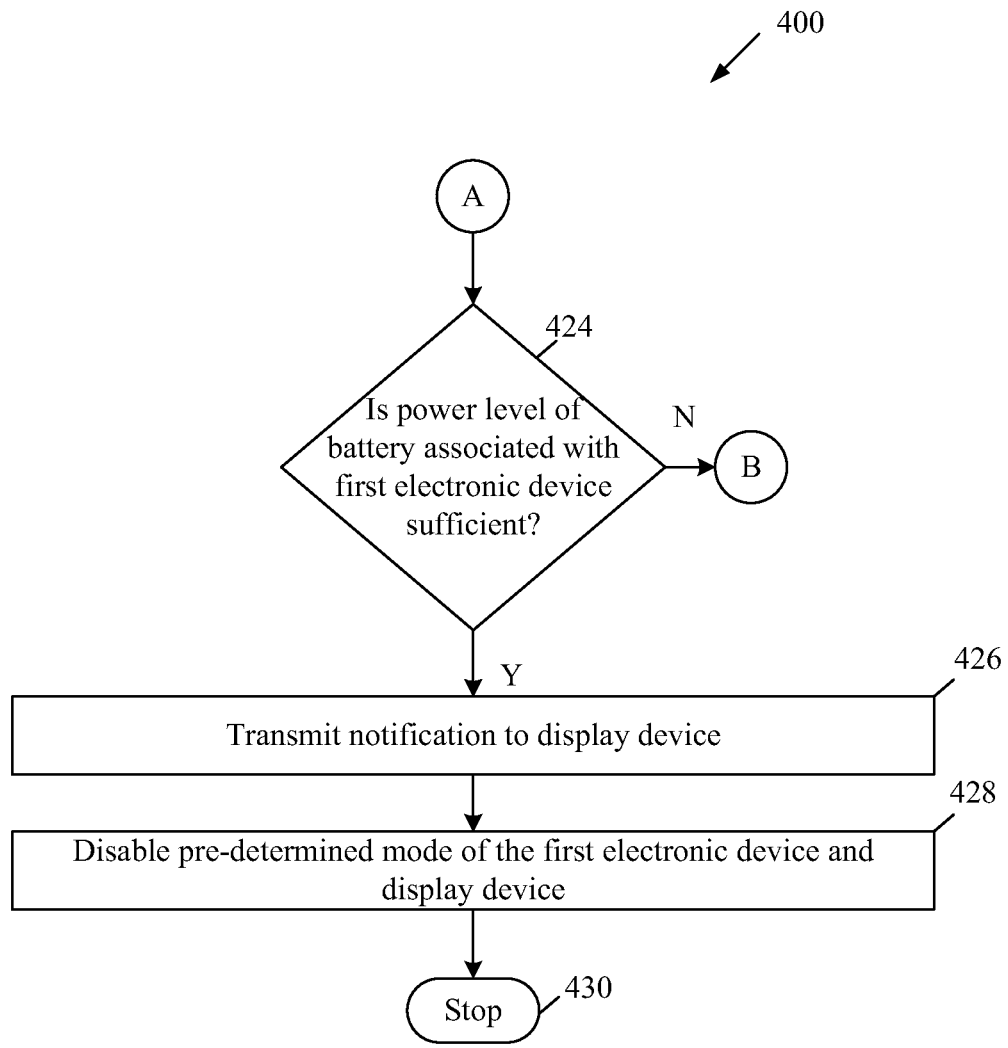

FIGS. 4A and 4B are an exemplary flow chart that illustrates a method for transmission of audio data, in accordance with an embodiment of the disclosure. With reference to FIGS. 4A and 4B, there is shown a flow chart 400. The flow chart 400 is described in conjunction with FIGS. 1, 2A, and 2B. The method starts at step 402 and proceeds to 404.

At step 404, a pre-determined operation, such as a tapping operation, may be performed between the first electronic device 102, and the display device 104. At step 406, it may be determined whether the first electronic device 102 is an authenticated device. In instances when the first electronic device 102 is not authenticated with the display device 104, the control passes to step 408. At step 408, registration of the first electronic device 102 may be performed and the control passes to step 410. In instances when the first electronic device 102 is authenticated with the display device 104, the control passes to step 410. At step 410, the pre-determined mode, such as a wireless headset mode, may be enabled in both the first electronic device 102 and the display device 104. At step 412, a user selection for an FM band associated with one or more multimedia components may be received. The user selection may be received via metadata content displayed at the first UI and/or the second UI.

At step 414, the selected one or more multimedia components may be received, via the associated FM band. At step 416, it may be determined whether the first electronic device 102 is connected to the second electronic device 106. In instances when the first electronic device 102 is not connected to the second electronic device 106, the control passes to step 418. At step 418, the received one or more multimedia components may be reproduced at the first electronic device 102. In instances when the first electronic device 102 is connected to the second electronic device 106, the control passes to step 420. At step 420, the received one or more multimedia components may be transmitted to the second electronic device 106. At step 422, the one or more multimedia components may be reproduced at the second electronic device 106.

At step 424, it may be determined whether the power level of the battery associated with the second electronic device 106 is sufficient. In instances when the power level is more than the pre-defined threshold value, the control passes back to step 420. In instances when the power level is less than the pre-defined threshold value, the control passes to step 426. At step 426, a notification may be sent to the display device 104. At step 428, the pre-determined mode of the first electronic device 102 and the display device 104 may be disabled. The control passes to end step 430.

Figure 5A:
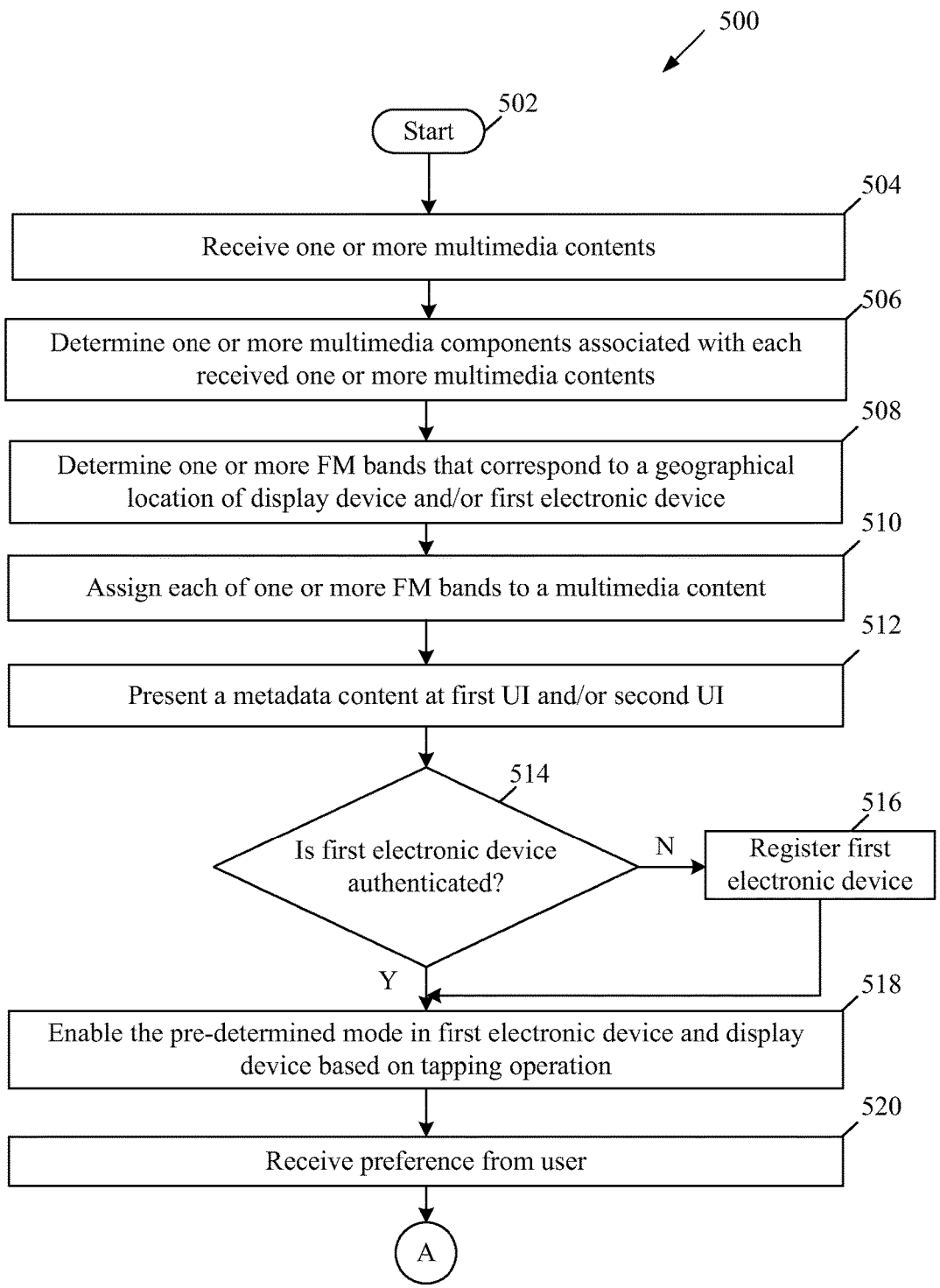
FIGS. 5A and 5B are flowcharts that illustrate another method for audio data transmission, in accordance with an embodiment of the disclosure.
Figure 5B:
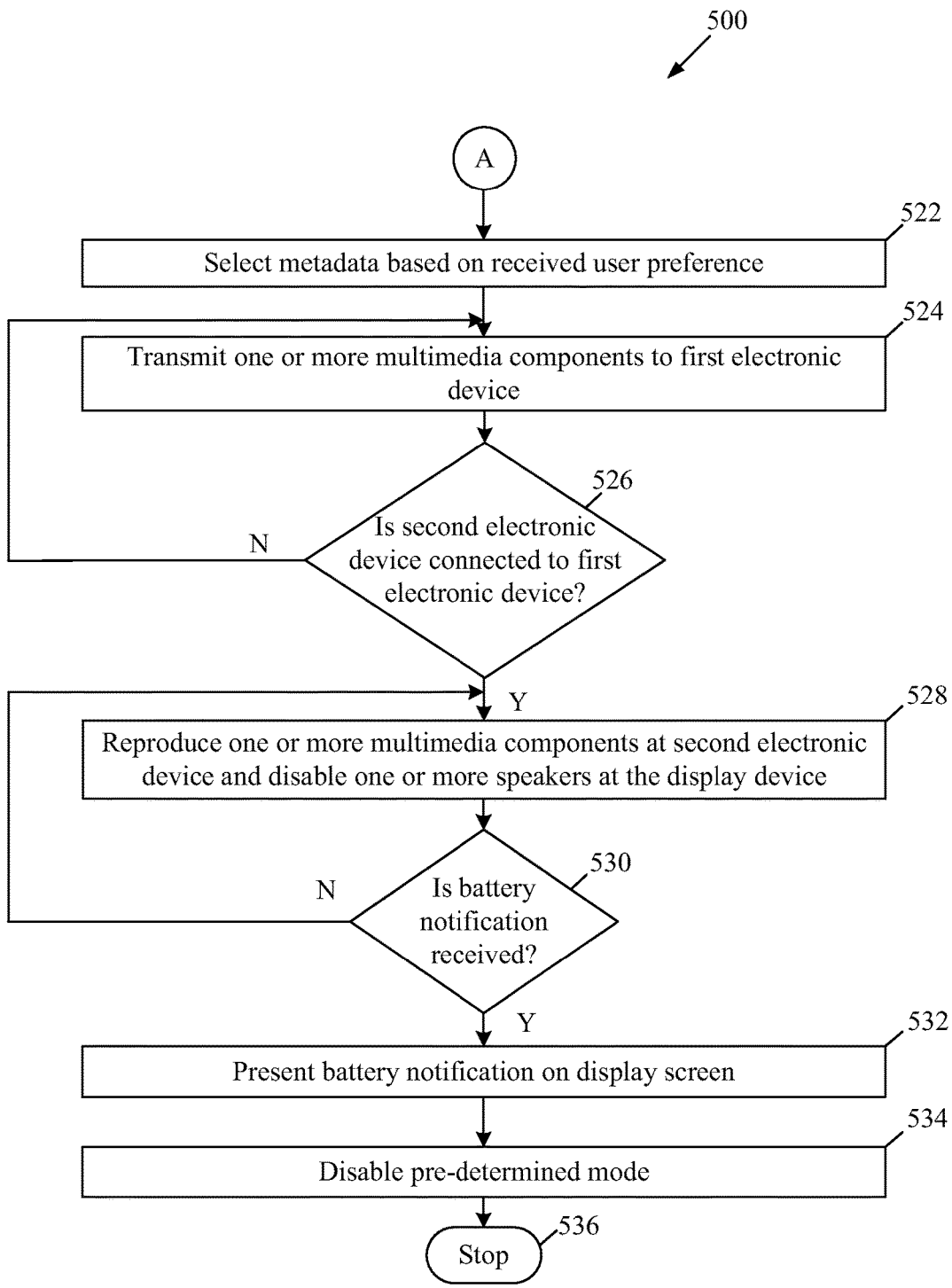

FIGS. 5A and 5B are an exemplary flow chart that illustrates another method for transmission of audio data, in accordance with an embodiment of the disclosure. With reference to FIGS. 5A and 5B, there is shown a flow chart 500. The flow chart 500 is described in conjunction with FIGS. 1, 2A, and 2B. The method starts at step 502 and proceeds to 504.

At step 504, one or more multimedia contents may be received by the display device 104. At step 506, one or more multimedia components associated with each of the received one or more multimedia contents may be determined. At step 508, one or more FM bands that correspond to a geographical location of the display device 104 and/or the first electronic device 102 may be determined. At step 510, each of the one or more FM bands may be assigned to a corresponding multimedia content, automatically or manually. At step 512, metadata content may be displayed at the first UI and/or the second UI. The displayed metadata content may comprise the one or more multimedia contents, the one or more multimedia components associated with each of the one or more multimedia contents, and/or the corresponding FM band assigned to each of the one or more multimedia contents.

At step 514, an authentication of the first electronic device 102, via a short-range communication network (such as the NFC network), may be determined. In an instance when the first electronic device 102 is not an authenticated device, the control passes to step 516. At step 516, the first electronic device 102 may be registered. Control passes back to step 514. In an instance when the first electronic device 102 is an authenticated device, control passes to step 518. At step 518, the pre-determined mode, such as a wireless headset mode, may be enabled in both the first electronic device 102 and the display device 104. The pre-determined mode may be enabled when a predetermined operation, such as a tapping operation, is performed between the first electronic device 102 and the display device 104. In accordance with an embodiment, steps 504 to 512 may be performed once the pre-determined mode is enabled at the display device 104.

At step 520, the preference from the displayed metadata content may be received from the user 114. At step 522, one of the metadata contents may be selected based on the preference received from the user 114. At step 524, the corresponding multimedia content may be rendered at the first electronic device 102. Further, based on the selection of the metadata content, one or more multimedia components may be transmitted to the first electronic device 102. At step 526, it may be determined whether the second electronic device 106 is connected to the first electronic device 102. In an instance, when the second electronic device 106 is connected to the first electronic device 102, control passes to step 528. At step 528, the one or more multimedia components may be reproduced at the second electronic device 106 and the one or more speakers at the display device 104 may be disabled.

At step 530, it may be determined whether an insufficient battery notification is received. In instances when the insufficient battery notification is not received, the control passes back to step 528. In instances when the battery notification is available, the control passes to step 532. At step 532, the insufficient battery notification may be displayed at the second UI rendered at the second display screen 112. At step 534, the pre-determined mode may be disabled. The control passes to end step 536.

In accordance with an embodiment of the disclosure, the system for audio data transmission may comprise one or more processors, such as the processor 202 (FIG. 2A), in the first electronic device 102 (FIG. 1). The processor 202 may be operable to select a frequency modulation (FM) band to receive an audio portion of multimedia content. The multimedia content may be rendered at the display device 104. The processor 202 may further be operable to receive a video description portion of the multimedia content, via the selected FM band.

In accordance with another embodiment of the disclosure, the system for audio data transmission may comprise one or more processors, such as the processor 212 (FIG. 2B), in the display device 104 (FIG. 1). The processor 212 may transmit an audio portion (FIG. 1) of the multimedia content, via a selected FM band. The processor 212 may further transmit video description portion of the multimedia content to the first electronic device 102, via the selected FM band. The transmission of the audio portion may be synchronized with the transmission of the video description portion.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for audio data transmission. The at least one code section in an electronic device may cause the machine and/or computer to perform the steps that comprise selection of a frequency modulation (FM) band. The selected FM band may be used to receive an audio portion of multimedia content rendered at a display device. The method may further comprise receiving video description portion of the multimedia content, via the selected FM band.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for audio data transmission, comprising:
in a first electronic device:
receiving an authentication request from a second electronic device;
transmitting a response to said second electronic device based on said authentication request,
wherein said second electronic device authenticates said first electronic device based on said response;
selecting a frequency modulation (FM) band based on said authentication;
receiving an audio portion and a video description portion of multimedia content, from said second electronic device, via said selected FM band,
wherein said multimedia content is rendered at a display screen of said second electronic device; and
selecting said FM band via a user interface (UI) rendered at said first electronic device.

2. The method according to claim 1, wherein said multimedia content comprises at least said audio portion, a video portion and said video description portion.

3. The method according to claim 1, wherein said audio portion corresponds to a primary audio associated with said multimedia content.

4. The method according to claim 1, wherein said video description portion corresponds to a secondary audio associated with said multimedia content.

5. The method according to claim 4, wherein said video description portion comprises at least one of a first audio that describes a video portion associated with said multimedia content, or a second audio that describes additional information associated with said multimedia content.

6. The method according to claim 5, wherein said additional information comprises at least one of Electronic Program Guide (EPG) information, a trailer, a synopsis, a closed-caption, a sub-title, a title, a rating, genre information, or metadata content associated with said multimedia content.

7. The method according to claim 1,
wherein said audio portion is associated with a first set of audio characteristics, and
wherein said video description portion is associated with a second set of audio characteristics.

8. The method according to claim 7, wherein said first set of audio characteristics and said second set of audio characteristics comprise at least one of a pitch, a tone, an intensity, or harmonic content associated with said audio portion and said video description portion, respectively.

9. The method according to claim 7, further comprising transmitting said audio portion and said video description portion to a third electronic device via a short-range communication network.

10. The method according to claim 9,
wherein said audio portion is played back in synchronization with said video description portion, at said third electronic device, and
wherein said synchronization comprises an adjustment of said first set of audio characteristics with respect to said second set of audio characteristics.

11. The method according to claim 1, further comprising transmitting a notification, to said display screen of said second electronic device, based on a power level of a battery of said first electronic device that is less than a threshold.

12. A method for audio data transmission, comprising:
in a first electronic device:
transmitting an authentication request to a second electronic device;
receiving a response from said second electronic device based on said authentication request;
authenticating said second electronic device based on said response;
transmitting, via a first frequency modulation (FM) band, a first audio portion and a first video description portion of first multimedia content to said second electronic device based on said authentication,
wherein said first multimedia content is rendered at a display device of said first electronic device,
wherein said second electronic device selects said first FM band to receive said first audio portion and said first video description portion of said first multimedia content via said selected first FM band,
wherein said first audio portion is synchronized with said video description portion; and assigning said selected first FM band, to said first multimedia content, via a user interface (UI) associated with said display device of said first electronic device.

13. The method according to claim 12, further comprising selecting at least one of a language of said first audio portion and said first video description portion based on one of a user preference received via said UI, a geographical location of said display device, or said first electronic device.

14. The method according to claim 12, wherein said first audio portion and said first video description portion are further transmitted to a third electronic device by said second electronic device via a short-range communication network.

15. The method according to claim 14, further comprising disabling at least one speaker associated with said display device of said first electronic device, based on a playback of at least one of said transmitted first audio portion or said first video description portion at said third electronic device.

16. The method according to claim 12, further comprising rendering second multimedia content at said display device of said first electronic device.

17. The method according to claim 16, further comprising transmitting a second audio portion of said second multimedia content via a selected second FM band.

18. The method according to claim 17, further comprising transmitting a second video description portion of said second multimedia content, to said second electronic device, via said selected second FM band.

19. A system for audio data transmission, comprising:
one or more processors in a first electronic device, said one or more processors configured to:
receive, via a transceiver, an authentication request from a second electronic device;
transmit, via said transceiver, a response to said second electronic device based on said authentication request,
wherein said second electronic device authenticates said first electronic device based on said response;
select a frequency modulation (FM) band based on said authentication;
receive an audio portion and a video description portion of multimedia content, from said second electronic device, via said selected FM band,
wherein said multimedia content is rendered at a display screen of said second electronic device; and
select said FM band via a user interface (UI) rendered at said first electronic device.

20. A system for audio data transmission, said system comprising:
one or more processors in a first electronic device, said one or more processors configured to:
transmit, via a transceiver, an authentication request to a second electronic device;
receive, via said transceiver, a response from said second electronic device based on said authentication request;
authenticate said second electronic device based on said response;
transmit, via a frequency modulation (FM) band, an audio portion and a video description portion of multimedia content to said second electronic device based on said authentication,
wherein said multimedia content is rendered at a display screen of said first electronic device, and
wherein said second electronic device selects said FM band to receive said audio portion and said video description portion of said multimedia content via said selected FM band, and
wherein said audio portion is synchronized with said video description portion; and assign said selected first FM band, to said first multimedia content, via a user interface (UI) associated with said display screen of said first electronic device.

* * * * *